United States Patent [19]

Ridenour

[11] Patent Number: 5,658,025
[45] Date of Patent: Aug. 19, 1997

[54] FLARE-TUBE ASSEMBLY

[75] Inventor: Ralph G. Ridenour, Mansfield, Ohio

[73] Assignee: Universal Enterprises, Inc., Mansfield, Ohio

[21] Appl. No.: 498,119

[22] Filed: Jul. 5, 1995

[51] Int. Cl.[6] ............................................ F16L 35/00
[52] U.S. Cl. ................... 285/334.5; 285/382.4; 29/511; 29/516; 29/520
[58] Field of Search ............... 285/334.5, 382.4, 285/353, 393; 29/511, 516, 520

[56] References Cited

U.S. PATENT DOCUMENTS

| | | | |
|---|---|---|---|
| 509,743 | 11/1893 | Lane | 285/334.5 X |
| 771,682 | 10/1904 | Sussman | 285/334.5 X |
| 1,804,814 | 5/1931 | Schultis | 285/334.5 |
| 1,987,100 | 1/1935 | Dick | 285/334.5 X |
| 2,212,183 | 8/1940 | Parker | 285/334.5 |
| 2,316,711 | 4/1943 | Parker et al. | 285/334.5 |
| 2,415,472 | 2/1947 | Dorman | 285/334.5 X |
| 2,444,622 | 6/1948 | Wolfram | 285/334.5 |
| 3,532,365 | 10/1970 | Kronschnabel | 285/334.5 |
| 4,133,565 | 1/1979 | Shutt | 285/334.5 |
| 5,439,259 | 8/1995 | Taga et al. | 285/334.5 |

FOREIGN PATENT DOCUMENTS

| | | | |
|---|---|---|---|
| 931194 | 7/1973 | Canada | 285/334.5 |

*Primary Examiner*—Terry Lee Melius
*Assistant Examiner*—Heather Shackelford
*Attorney, Agent, or Firm*—Pearne, Gordon, McCoy & Granger LLP

[57] ABSTRACT

A flare-tube assembly is provided that includes a tube having a flare at a forward end thereof which angles outwardly and rearwardly and is generally S-shaped in cross-section. The flare-tube assembly also includes an inverted flare fitting which has external threads, an opening extending therethrough, and a shoulder encircling the opening at a forward end of the fitting. The shoulder has a recessed portion near an outer diameter of the shoulder which is inwardly arcuate in cross-section. The tube extends through the opening with the shoulder of the fitting facing a rear side of the flare. During installation, the fitting is torqued such that the shoulder of the fitting first engages and compresses an outer portion of the flare to form a seal at the outer portion. Upon further torquing, the shoulder of the fitting engages the entire surface of the flare to compress the entire flare.

22 Claims, 2 Drawing Sheets

FLARE-TUBE ASSEMBLY

BACKGROUND OF THE INVENTION

1. Field of the Invention

The present invention relates to flare-tube assemblies and, more particularly, to flare-tube assemblies which maintain a seal when mated with rough castings and under relatively high temperatures.

2. Description of Related Art

Flare-tube assemblies which provide fluid-tight seals are known. One type of flare-tube assembly commonly used in the art has a tube with a forward facing flared end and a fitting or nut slidably retained on the tubing. The flare is conically-shaped having an angle typically of about 45 degrees to the tube axis. The nut has a shoulder facing the flare which also is at a 45 degree angle to the tube axis. The flare end of the tube is inserted into a coupling member which also has an annular lateral shoulder at an angle of about 45 degrees to the tube axis. As the nut is torqued to thread the nut and coupling together, the shoulder of the nut engages generally the entire rear surface of the flare of the tube and presses the flare against the shoulder of the coupling to establish a fluid-tight seal. Care must be taken, however, to avoid over torquing the nut because the shoulder of the nut will shear the flare off the tube.

This type of flare-tube assembly may fail under several conditions. The flare-tube assembly may not properly seal when the coupling is a raw casting. Leakage can occur when the flare is pressed against a rough and porous surface. The flare-tube assembly also may not properly seal under relatively high temperatures. For example, gas tubing connected directly to some sealed burners of a gas stove may fail if the flare-tube assembly connection exceeds a certain temperature. Some sealed burners may reach temperatures of up to and over 500 degrees Fahrenheit. At this temperature leaks may occur because the metal components of the connection relax. Accordingly, there is a need in the art for an improved flare-tube assembly that provides a fluid-tight seal with a rough and porous coupling surface. Additionally, there is a need in the art for an improved flare-tube assembly which remains sealed without leakage when subjected to relatively high temperatures at which conventional flare-tube assemblies may relax and leak.

SUMMARY OF THE INVENTION

The present invention provides flare-tube assembly which overcomes the above-noted problems of the related art. The flare-tube assembly includes a tube having a flare at a forward end thereof and a fitting having an opening therethrough. The fitting also has a shoulder encircling the opening at a forward end of the fitting. The tube extends through the opening with the shoulder facing a rear side of the flare. The shoulder is adapted to first engage the flare near an outer diameter of the flare upon axial movement of the fitting toward the flare. When the flare-tube assembly is installed, therefore, the outer portion of the flare is compressed before compressing the entire flare so that a relatively high compressive force is obtained compared to conventional flare-tube assemblies which would shear off their flares at these loads.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figures 1, 2:
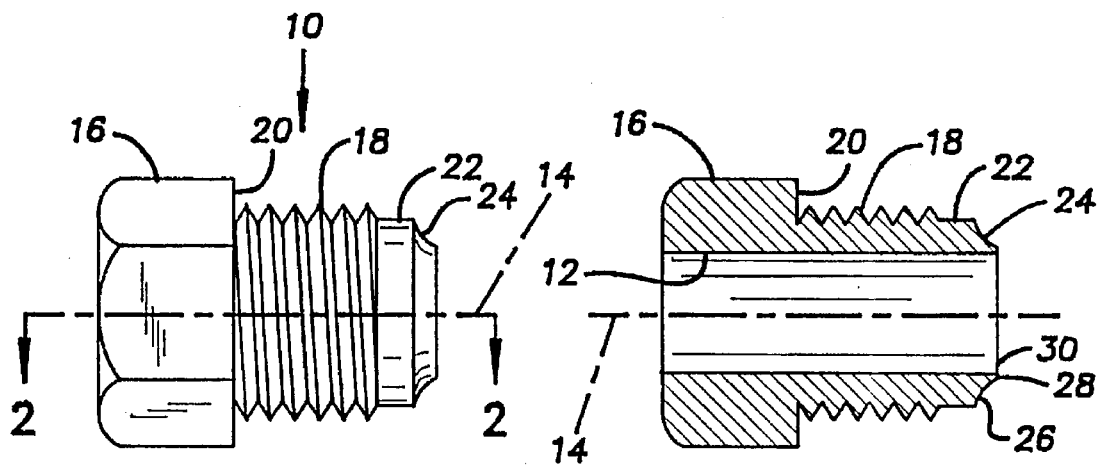
FIG. 1 is a longitudinal view of an inverted flare fitting according to the invention.
FIG. 2 is a longitudinal view, in cross-section, of the inverted flare fitting along line 2 of FIG. 1.

FIGS. 1 and 2 illustrate an inverted-flare nut or fitting 10 according to the present invention. The fitting is formed from a suitable material such as, for example, brass. The fitting has a central passage or opening 12, circular in cross-section, on a longitudinal axis 14 of the fitting 10. The passage 12 extends through each end of the fitting 10 and is sized and shaped for receiving a tube therethrough. The fitting 10 has a rear portion provided with a wrench pad 16 such as, for example, a hexagonal surface for applying a torque to the fitting 10 with a wrench. The fitting 10 has a central portion provided with male threads 18 to form an inverted fitting. The wrench pad 16 forms an outer diameter generally larger than an outer diameter of the male threads 18 to provide an abutment 20. The fitting 10 has a forward portion provided with a lead-on portion 22. The lead-on portion 22 is generally cylindrically-shaped to provide an axial alignment means to lead into female threads to which the male threads 22 mate.

The fitting 10 is also provided with a annular shoulder 24 surrounding the central passage 12 at the forward or proximal end of the fitting 10. The shoulder 24 has a recessed portion 26 near the outer diameter of the fitting 10. The recessed portion 26 is concave, that is, inwardly curved or arcuate in cross-section. The center of curvature of the recessed portion 26 lies on a cylindrical plane containing the outer surface of the lead-on portion 22 such that the recessed portion 26 is substantially perpendicular to the lead on portion 26 at the intersection of the shoulder 24 and the lead on portion 26. Therefore, the convex recessed portion 26 is generally perpendicular to the longitudinal axis 14 near the outer diameter of the recessed portion 26. For example, a fitting 10 for use with a 0.250 inch diameter tube can have a recess portion 26 longitudinal depth of about 0.035 inches with a radius of curvature of about 0.078 inches at a 0.400 inch lead-on portion diameter.

Shaped in this manner, the recessed portion 26 generally forms a rearward or inverted angle relative to the longitudinal axis 14 of the fitting 10, that is, the recessed portion 26 generally forms an angle of greater than 90 degrees relative to the longitudinal axis 14 at a forward end of the fitting 10. The shoulder 24 also has a nose portion 28 inward of the recessed portion 26 and near the central passage 12. The nose portion 28 is provided with a radius 30 to eliminate a sharp edge formed by the intersection of the nose portion 28 and the central passage 12 which may shear a tube flare.

Figure 3:
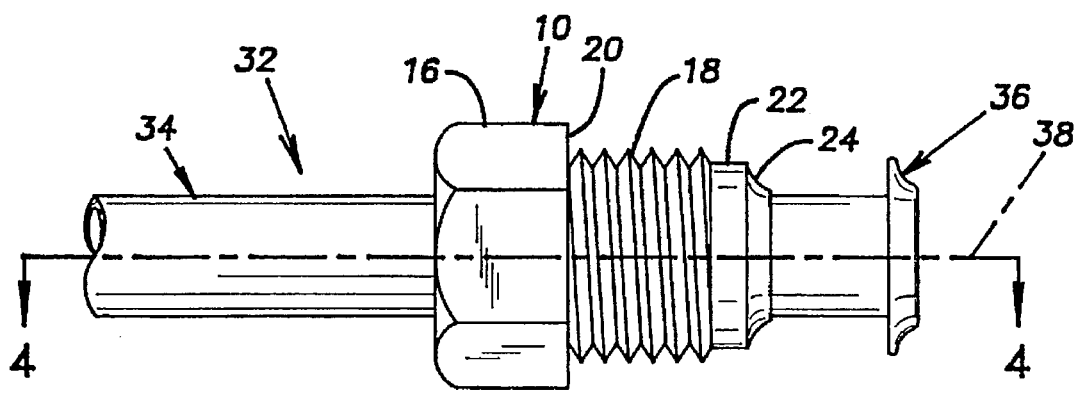
FIG. 3 is a longitudinal view of a flare-tube assembly according to the invention.
Figure 4:
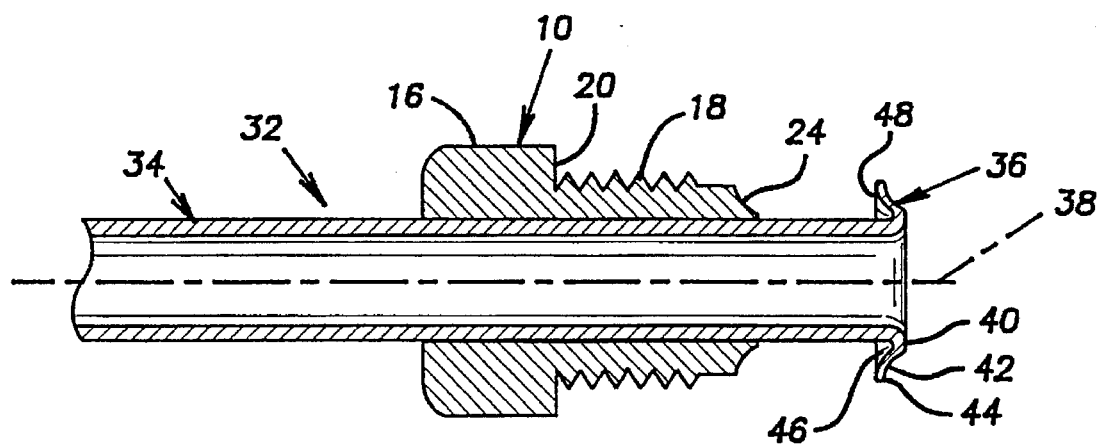
FIG. 4 is a longitudinal view, in cross-section, of the flare-tube assembly along line 4 of FIG. 3.

FIGS. 3 and 4 illustrate a flare-tube assembly 32 according to the invention. The flare-tube assembly 32 includes the fitting 10 and a formed tube 34. The tube 34 is typically formed of a malleable and corrosion resistant metal such as, for example, aluminum or copper.

A flare 36 is formed on the tube 34 at a forward or proximal end thereof. The flare 36 of the illustrated embodiment generally forms a rearward or inverted angle relative to a longitudinal axis 38 of the tube 34, that is, material of the tube 34 is bent generally greater than 90 degrees relative to the longitudinal axis 38 of the tube 34 to form the flare 36. The angle will vary depending on the material, diameter, and wall thickness of the tube 34. The outer diameter of the flare 36 is generally equal to the outer diameter of the shoulder 24 of the fitting.

It is noted that while the flare 36 of the illustrated embodiment has an angle of greater than 90 degrees, the flare 36 can be configured with an angle of 90 degrees or less. However, the shoulder 24 of the fitting 10 must be accordingly adapted such that the outer portion 44 of the flare 36 is first squeezed to obtain a seal prior to distributing the torque over substantially all of the rear side 48 of the flare 36.

An inner portion 40 of the flare 36 curves outwardly from the wall of the tube 34. A central portion 42 of the flare 36 curves rearwardly and outwardly from the inner portion 40 and extends at an angle relative to the longitudinal axis 38 of the tube 34. An outer portion 44 of the flare 36 curves outwardly from the inclined central portion 42 and is substantially perpendicular to the longitudinal axis 38 of the tube 34 at or near the outer diameter of the flare 36. Formed in such a manner, the flare 36 is generally at least partially shaped like a rearwardly-inclined "S" in cross-section. The flare 36 also forms a recess 46 at the outer surface of the tube 34 on a rear side 48 of the flare 36. For example, a flare of 0.250 diameter tube 34 can have an outer diameter of about 0.415 inches with a bend radius of about 0.015 inches located on a diameter of about 0.286 inches.

The tube 34 preferably has an outer diameter in the range of about ⅛ inch to about 1 inch. The central passage 12 of the fitting 10 is preferably sized to closely receive the tube 34. For example, the diameter of the central passage 12 is preferably in the range of about 0.254 inches to about 0.257 for a 0.250 inch diameter tube 34. As shown in FIGS. 3 and 4, the tube 34 extends through the central passage 12 of the fitting 10 such that the shoulder 24 of the fitting 10 is forwardly facing, that is, facing the rear side 48 of the flare 36 of the tube 34.

It is noted that the flare 36 of the tube 34 and the shoulder 24 of the fitting 10 can have numerous shapes as long as they are each sized and shaped to cooperate with each other such that the shoulder 24 first engages the flare 36 at the rear side 40 of the flare 36 near the outer diameter of the flare on the outer portion 44 when the fitting 10 is axially moved toward the flare 36. The flare 36 of the tube 34 and the shoulder 24 of the fitting 10 are also each sized and shaped to cooperate such that once the outer portion 44 of the flare 36 is squeezed or compressed, the shoulder 24 substantially engages and compresses the entire rear side 48 of the flare 36.

Figure 5:
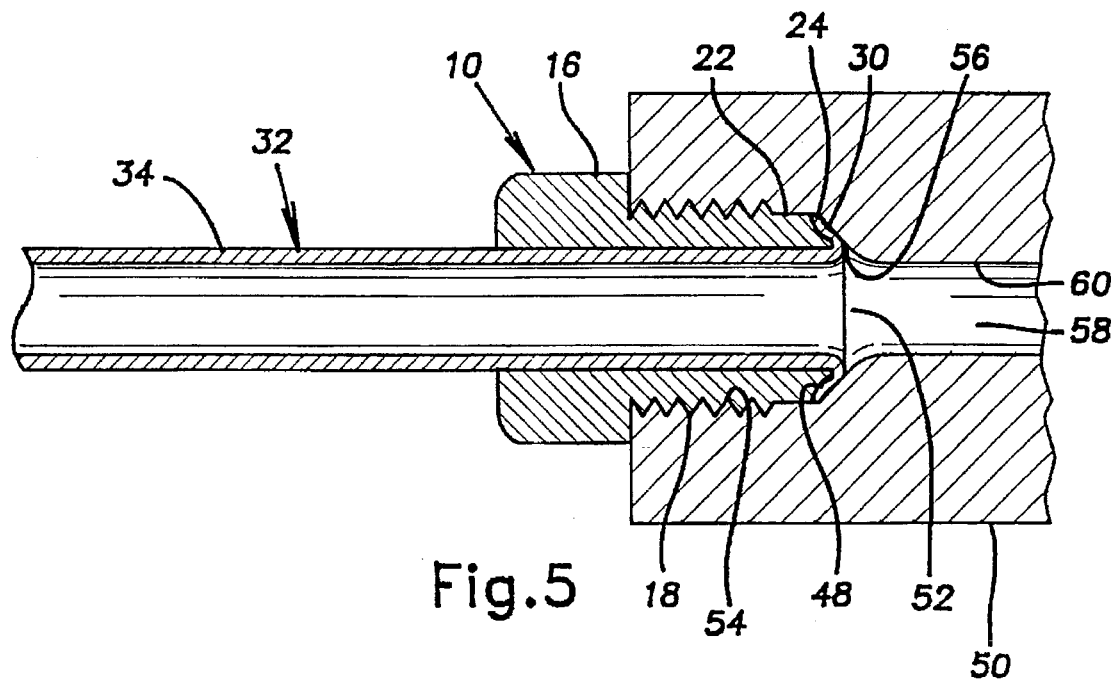
FIG. 5 is a longitudinal view, in cross-section, of a the flare-tube assembly installed in a cavity of a casting.

FIG. 5 illustrates the tube-fitting assembly 32 with the fitting 10 threaded into a coupling or casting 50 and exerting a compressive force on the flare 36 in the longitudinal direction to obtain a fluid tight seal. The casting 50 is raw, that is, the casting 50 has unmachined surfaces that are rough and porous. The casting 50 has a cavity 52 provided with internal or female threads 54 and an inwardly angled or generally frusto-conically-shaped shoulder or bottom 56. The bottom 56 of the cavity 52 opens into a central space or passage 58 of the casting 50.

The forward end of the tube 34 and the fitting 10 are inserted into the cavity 52 of the casting 50. The lead-on portion 22 of the fitting 10 helps to align the fitting to be substantially coaxial with the cavity 52 of the casting 50 to avoid cross-threading. The external threads 18 of the fitting 10 are interthreaded with the internal threads 54 of the casting 50 by applying a torque to the wrenching pad 16. The interthreading of the fitting 10 and casting 50 causes the shoulder 24 of the fitting 10 to first engage the rear side 48 of the flare 36 at the outer portion 44, 33 that is, near the outer diameter of the flare 36. "Near" as used herein for all embodiments at or close to the outer diameter of the flare so that the desired results occur. As the fitting 10 is further torqued, the recessed portion 26 of the shoulder 24 compresses the outer portion 44 of the flare 36 against the bottom 56 of the casting 50. As the recessed portion 26 of the shoulder 24 engages the outer portion 44, the nose portion 28 of the shoulder is within the recess 42 formed by the flare 36 such that the torque is substantially applied near the outer diameter of the flare 36. As the outer portion 44 of the flare 36 is compressed, the material of the flare 36 is squeezed into the rough and porous surface of the casting 50 and establishes a fluid-tight seal which will hold a pressure of, for example, 2800 psi.

Torque is further applied to the wrenching pad 16 until the compressive force from the shoulder 24 of the fitting 10 is substantially distributed over the entire surface of the rear side 48 of the flare 36. Because the shoulder 24 of the fitting 10 and the bottom 56 of the cavity 52 are at an angle to the longitudinal axis, both an axial and radial component of the compressive force is applied to the flare 36 such that the flare 36 is forced somewhat inwardly toward the longitudinal axis 38 of the tube 34. The rough and porous surface of the casting 50, however, substantially prevents extrusion of the material of the flare 36. As a result of compressing only the outer portion of the flare 36 before compressing the entire flare 36, a relatively high compressive force is obtained by the flare-tube assembly 32 of the present invention compared to conventional flare-tube assemblies. Conventional flare-tube assemblies would shear off their flares at these loads.

The increased compressive force enables the flare-tube assembly to be used with rough castings because the material of the flare 36 is squeezed into and fills areas of the rough surface such as, for example, pits and pores 60. The relatively high compressive force deforms the flare 36 such that it forms to the rough and porous surface to obtain a fluid-tight seal as best shown in FIG. 5. The costs of a machining operation to obtain a smooth sealing surface for the flare are eliminated. It is noted that at these relatively high compressive forces, the shoulder 24 of the fitting 10 also compressively deforms to aid in forming the fluid-tight seal between the flare 36 and the bottom 56 of the cavity 52.

Additionally, the increased compressive force enables the flare-tube assembly 32 of the present invention to withstand relatively high temperatures without leakage compared to conventional flare-tube assemblies. The flare-tube assembly 32 can withstand the relatively high temperatures because it allows for expansion and contraction of the different metals as the temperature of the joint changes. The flare tube assembly 32 of the present invention can remain sealed at temperatures of at least about 350 degrees, more preferably to at least about 550 degrees Fahrenheit, and most preferably to at least about 700 degrees Fahrenheit depending on the materials used. Conventional flare-tube assemblies would not remain sealed at such temperatures. The seal is maintained because the increased pressure or compressive force by the fitting 10 on the flare 36 maintains constant pressure between the flare 36 and the bottom 56 of the cavity 52 even when the components relax due to the relatively high temperatures.

Figure 6:
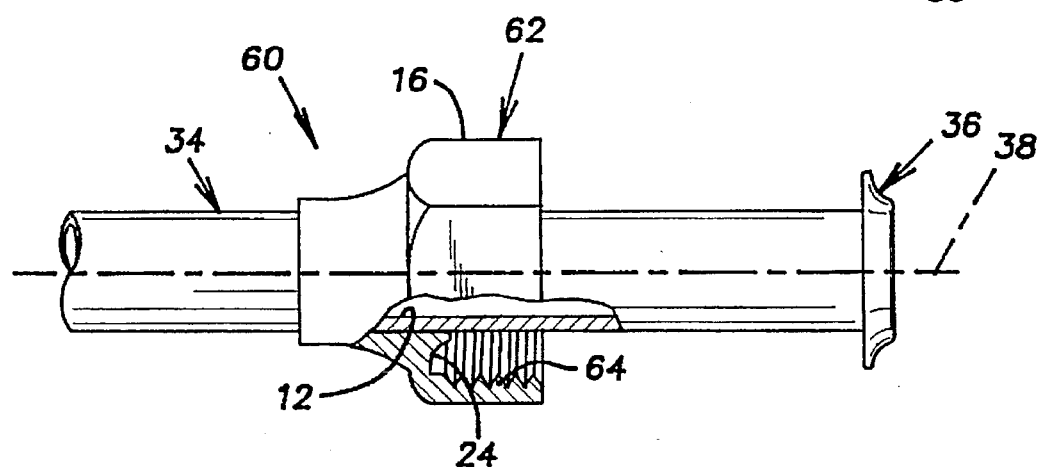
FIG. 6 is a longitudinal view, in partial cross-section, of another flare-tube assembly according to the invention.

FIG. 6 illustrates another flare-tube assembly 60 according to the invention wherein like numerals are used for like features. The flare-tube assembly 60 is similar to the flare-tube assembly 32 described above except that it includes a flare fitting 62 instead of the inverted flare fitting 10, that is, the flare fitting 62 includes internal or female threads 64 instead of external threads 18. The internal threads 64 of the flare fitting 62 mate with external threads of the coupling or casting 50. The flare fitting 60 is otherwise similar to the inverted flare fitting 10. The flare-tube assembly 60 is installed to the casting 50 and operates in the same manner as described above for the other flare tube assembly 32.

Figure 7:
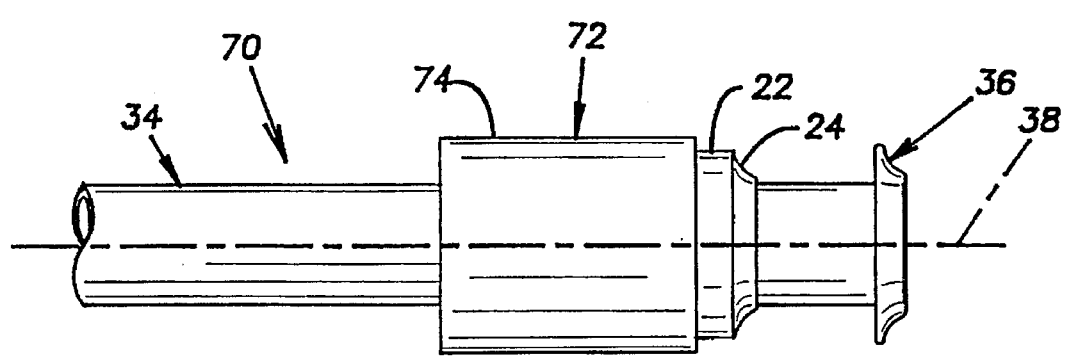
FIG. 7 is a longitudinal view, in partial cross-section, of further flare-tube assembly according to the invention.

FIG. 7 illustrates a further flare-tube assembly 70 according to the invention wherein like numerals are used for like features. The flare-tube assembly 70 is similar to the flare-tube assemblies 32, 60 described above except that it includes a press flare fitting 72 instead of the threaded flare fittings 10, 62, that is, the press flare fitting 72 includes a round cylinder 74 instead of the threads 18, 64 and it does not include a wrench pad 16. The round cylinder 74 of the press flare fitting 72 mates with a round opening in the coupling or casting 50 which is sized for a press fit. The press flare fitting 70 is otherwise similar to the threaded flare fittings 10, 60. The flare-tube assembly 60 is installed to the casting 50 and operates in the same manner as described above for the other flare-tube assemblies 32, 60 except that the press flare fitting 72 is pressed into the casting 50 instead of threaded into the casting 50.

Although particular embodiments of the present invention have been described in detail, it will be understood that the invention is not limited correspondingly in scope, but includes all changes and modifications coming within the spirit and terms of the claims appended hereto.

What is claimed is:

1. A flare-tube assembly for connection with a coupling to provide a fluid-tight seal, said flare-tube assembly comprising:
   a tube having an inverted flare at a forward end thereof which generally angles outwardly and rearwardly, said flare having a free end portion at a first angle and a first distance from a longitudinal axis of said tube; and
   a fitting having an opening therethrough and a shoulder encircling said opening at a forward end of said fitting, said shoulder having an outer portion at a second angle and a second distance from the longitudinal axis of the tube, said tube extending through said opening with said shoulder facing a rear side of said flare, said angles and distances arranged such that said shoulder only engages said flare at said free end portion of said flare prior to connection with the coupling so that high compressive force can be obtained during connection with the coupling without shearing said flare.

2. The flare-tube assembly as set forth in claim 1, wherein said fitting is an inverted flare fitting having external threads.

3. The flare-tube assembly as set forth in claim 1, wherein said fitting has internal threads.

4. The flare-tube assembly as set forth in claim 1, wherein said fitting has an externally round cylinder sized for a press fit.

5. The flare-tube assembly as set forth in claim 1, wherein said shoulder angles outwardly and rearwardly.

6. The flare-tube assembly as set forth in claim 1, wherein said shoulder has a recessed portion at or near an outer diameter of said shoulder.

7. The flare-tube assembly as set forth in claim 6, wherein said recessed portion is at least partially concave in cross-section.

8. The flare-tube assembly as set forth in claim 7, wherein said recessed portion is generally perpendicular to a longitudinal axis of said fitting at the outer diameter of said shoulder.

9. The flare-tube assembly as set forth in claim 1, wherein said shoulder has a radius at said opening.

10. The flare-tube assembly as set forth in claim 1, wherein said flare angles outwardly and rearwardly.

11. The flare-tube assembly as set forth in claim 1, wherein said flare has a bend greater than 90 degrees.

12. The flare-tube assembly as set forth in claim 1, wherein at least a portion of said flare is arcuate in cross-section.

13. The flare-tube assembly as set forth in claim 1, wherein said flare is generally at least partially S-shaped in cross-section.

14. The flare tube assembly as set forth in claim 1, wherein said flare is generally perpendicular to a longitudinal axis of said tube at an outer diameter of said tube.

15. A flare-tube assembly for connection with a coupling to provide a fluid-tight seal, said flare-tube assembly comprising:
   a tube having an inverted flare at a forward end thereof, wherein said flare generally angles outwardly and rearwardly and is generally at least partially S-shaped in cross-section said flare having a free end portion at a first angle and a first distance from a longitudinal axis of said tube; and
   an inverted flare fitting having external threads, an opening extending therethrough and a shoulder encircling said opening at a forward end of said fitting, said shoulder having a recess which is at least partially concave in cross-section, an outer portion of said shoulder being at a second angle and a second distance from the longitudinal axis of the tube, said tube extending through said opening with said shoulder facing a rear side of said flare, said angles and distances of the flare and the shoulder being such that said shoulder only engages said flare at said free end portion of said flare prior to connection with the coupling so that high compressive forces can be obtained during connection with the coupling without shearing the flare.

16. The flare-tube assembly as set forth in claim 15, wherein said recessed portion of said shoulder is generally perpendicular to a longitudinal axis of said fitting at the outer diameter of said shoulder.

17. The flare-tube assembly as set forth in claim 15, wherein said shoulder has a radius at said opening.

18. The flare tube assembly as set forth in claim 15, wherein said flare is generally perpendicular to a longitudinal axis of said tube at an outer diameter of said tube.

19. A method for obtaining a fluid-tight seal comprising the steps of:
   (a) inserting an inverted flare which generally angles outwardly and rearwardly at a foreword end of a flared tube into a threaded coupling having a shoulder, the flare having a free end portion at a first angle and a distance from the longitudinal axis of the coupling;
   (b) interthreading a fitting with said threaded coupling, said fitting having an opening with said flared tube extending therethrough and a shoulder encircling said opening at a forward end of said fitting, the shoulder having an outer portion with a second angle and a second distance from the longitudinal axis of the coupling, the angles and distances arranged so that the shoulder of the fitting first engages the free end portion of the flare;

(c) torquing said fitting to first compress the free end portion of said flare between said shoulder of said fitting and said shoulder of said coupling so that high compressive forces can be obtained without shearing the flare.

20. The method as set forth in claim 19, further comprising the step of further torquing said fitting to compress substantially all of the flare between said shoulder of said fitting and said shoulder of said coupling.

21. The method as set forth in claim 19, wherein the step of interthreading the fitting includes moving said shoulder of said fitting toward the flare of the tube, said shoulder angling outwardly and rearwardly.

22. The method as set forth in claim 19, wherein the step of inserting includes engaging the shoulder of the coupling with the flare, said flare angling outwardly and rearwardly.

* * * * *